US011286426B2

(12) United States Patent
Wiklund

(10) Patent No.: US 11,286,426 B2
(45) Date of Patent: Mar. 29, 2022

(54) BIOGENIC LOW VISCOSITY INSULATING OIL

(71) Applicants: Avantherm AB, Bandhagen (SE); Neste Oyj, Espoo (FI)

(72) Inventor: Per Wiklund, Stockholm (SE)

(73) Assignees: NESTE OYJ, Espoo (FI); AVANTHERM AB, Stockholm (SE)

( * ) Notice: Subject to any disclaimer, the term of this patent is extended or adjusted under 35 U.S.C. 154(b) by 244 days.

(21) Appl. No.: 16/479,263

(22) PCT Filed: Jan. 24, 2018

(86) PCT No.: PCT/SE2018/050054
§ 371 (c)(1),
(2) Date: Jul. 19, 2019

(87) PCT Pub. No.: WO2018/139971
PCT Pub. Date: Aug. 2, 2018

(65) Prior Publication Data
US 2019/0382666 A1   Dec. 19, 2019

(30) Foreign Application Priority Data

Jan. 24, 2017 (SE) .................................... 1750058-8
Apr. 10, 2017 (EP) .................................... 17165805

(51) Int. Cl.
| C10G 7/00 | (2006.01) |
| C09K 15/08 | (2006.01) |
| H01B 3/22 | (2006.01) |
| C09K 5/10 | (2006.01) |
| C11B 3/12 | (2006.01) |

(52) U.S. Cl.
CPC .................. *C10G 7/00* (2013.01); *C09K 5/10* (2013.01); *C09K 15/08* (2013.01); *C11B 3/12* (2013.01); *H01B 3/22* (2013.01); *C10G 2300/1011* (2013.01); *C10G 2300/80* (2013.01); *C10G 2400/12* (2013.01)

(58) Field of Classification Search
CPC ..................................... C10G 7/10; C11B 3/12
See application file for complete search history.

(56) References Cited

U.S. PATENT DOCUMENTS

| 3,658,575 | A | * | 4/1972 | Tabor ................... D06M 23/10 |
| | | | | 427/335 |
| 4,023,980 | A | | 5/1977 | Prillieux et al. |
| 4,078,010 | A | | 3/1978 | Prillieux et al. |
| 8,658,575 | B2 | | 2/2014 | Singh et al. |
| 8,969,259 | B2 | | 3/2015 | Abhari et al. |
| 9,469,583 | B2 | | 10/2016 | Hakola et al. |
| 10,131,848 | B2 | * | 11/2018 | Aalto ................... C10M 105/00 |
| 2007/0060484 | A1 | | 3/2007 | Singh et al. |
| 2009/0001330 | A1 | | 1/2009 | Arickx et al. |
| 2009/0036337 | A1 | * | 2/2009 | Deskin ................... H01B 3/22 |
| | | | | 508/279 |
| 2010/0279904 | A1 | * | 11/2010 | Deskin ................. C10M 159/04 |
| | | | | 508/465 |
| 2014/0303057 | A1 | * | 10/2014 | Abhari ................... A01N 25/02 |
| | | | | 508/589 |
| 2015/0133355 | A1 | | 5/2015 | Abhari et al. |
| 2015/0191404 | A1 | * | 7/2015 | Aalto ....................... C10G 3/42 |
| | | | | 585/16 |
| 2016/0208184 | A1 | | 7/2016 | Wiersma et al. |
| 2017/0009119 | A1 | * | 1/2017 | Hahn .................... H01F 27/105 |
| 2017/0009144 | A1 | | 1/2017 | Aalto et al. |
| 2017/0009148 | A1 | | 1/2017 | Abhari et al. |
| 2017/0279904 | A1 | * | 9/2017 | Takemura ............. H04L 67/303 |
| 2019/0382666 | A1 | * | 12/2019 | Wiklund ............... C10M 177/00 |

FOREIGN PATENT DOCUMENTS

| CN | 1174225 A | 2/1998 | |
| CN | 101230304 A | 7/2008 | |
| CN | 101326592 A | 12/2008 | |
| CN | 102682869 A | 9/2012 | |
| CN | 105874039 A | 8/2016 | |
| EP | 2770512 A1 | 8/2014 | |
| WO | 2009018089 A1 | 2/2009 | |
| WO | WO-2009018089 A1 * | 2/2009 | .......... C10M 159/04 |
| WO | 2015044287 A1 | 4/2015 | |
| WO | WO-2015044287 A1 * | 4/2015 | ............... C10G 2/30 |

(Continued)

OTHER PUBLICATIONS

First Office Action dated Jul. 22, 2020, by the Chinese Patent Office in corresponding Chinese Patent Application No. 201880007799.3, and an English Translation of the Office Action. (13 pages).
Bruno, "Method and Apparatus for Precision In-Line Sampling of Distillate", Sep. Sci. Technol., 2006, pp. 309-314, vol. 41.
International Search Report (PCT/ISA/210) and Written Opinion (PCT/ISA/237) dated Apr. 18, 2018, by the Swedish Patent Office as the International Searching Authority for International Application No. PCT/SE2018/050054.
Search Report dated Oct. 27, 2017, by the European Patent Office for Application No. 17165805.7.

(Continued)

*Primary Examiner* — Liam J Heincer
*Assistant Examiner* — M. Reza Asdjodi
(74) *Attorney, Agent, or Firm* — Buchanan Ingersoll & Rooney PC

(57) ABSTRACT

A method of producing a non-petroleum based electrical insulating oil, wherein the method can include providing a primary mixture of non-petroleum origin, containing isomerized straight chain hydrocarbons; performing a distillation and/or stripping of the primary mixture; collecting a paraffinic base oil as a product of the distillation and/or stripping, containing a mixture of isoalkanes and alkanes; and mixing the base oil with an antioxidant additive.

20 Claims, No Drawings

(56) References Cited

FOREIGN PATENT DOCUMENTS

WO         2015101837 A2    7/2015
WO   WO-2015101837 A2 *  7/2015  .......... C10M 105/00

OTHER PUBLICATIONS

Weesmaa, et al., "Transformer oil specifications and important properties for optimal in-service life", 2014 ICHVE International Conference on High Voltage Engineering and Application, 2014, pp. 1-4.

Office Action (Notification of Reason for Refusal) dated Jan. 28, 2015, by the Korean Patent Office in corresponding Korean Patent Application No. 10-2019-7019745, and an English Translation of the Office Action. (9 pages).

* cited by examiner

BIOGENIC LOW VISCOSITY INSULATING OIL

TECHNICAL FIELD

The present disclosure relates to the field of electrical insulating oil. The insulating oil of the present disclosure is a non-petroleum based electrical insulating oil, comprising a paraffinic base oil and one or more additives.

BACKGROUND

An electrical insulating oil, also known as transformer oil, is an oil which forms a part of the electrical insulation in an electrical transformer and which further serves a purpose of circulating coolant in cooling of the same apparatus.

An electrical transformer converts alternating current of one voltage to another voltage. The main reason for use of transformers in an AC-grid is that generation and distribution is more efficient, i.e. leads to lower energy losses, at higher voltages and generally at lower currents. However, high voltage power is both impractical and dangerous at the site of energy consumption in homes and industry. Thus, especially at central locations in a grid, where a very large amount of energy is transformed, efficiency of transformation is paramount. This is also the case for more locally placed smaller distribution transformers, particularly considering the fact that there are many more of such small distribution transformers compared to the number of larger power transformers. The sum of absolute losses in this type of equipment is thus of considerable importance.

Losses in transformers can generally be divided into non-load and on-load losses. Non-load losses are caused by the magnetic core of the transformer and are not dependent on load, i.e. such non-load losses are constant for an energized transformer. On-load losses are primarily due to heat loss which is proportional to the electrical resistance of the windings. Electrical resistance of a material increases with temperature, and thus on-load losses are load dependent. Increasing the output from any given transformer leads to less efficient energy transformation and higher heat losses. Cooling of a transformer is therefore necessary. For transformers in smaller distribution units, this can be achieved with cooling fins or flanges on the outside of the casing. Some such transformers are filled with epoxy resin, some are immersed in oil. For high power transformers, such a simple design is not acceptable as dimensions would grow too large, and it is only with a circulating liquid coolant design that dimensions become reasonable. The most common solid insulation material in transformers is cellulose, a material that degrades ever more rapidly at temperatures above 100° C. The overall service life of a transformer is highly dependent on its operational temperature, a fact further contributing to the need for effective cooling.

The liquid used inside a transformer must be electrically insulating; hence oil is used. Such commercial insulating oils generally fulfil either the standard IEC 60296 or ASTM D3487 and are almost invariably made by refining of crude oil, i.e. are of fossil origin. In IEC 60296-2012 and ASTM D3487-2016 a maximum kinematic viscosity at 40° C. is set at 12 mm$^2$/s (or centistoke, cSt), to enable transformer manufacturers to guarantee that their cooling system would function with any oil fulfilling the standard. An oil of higher viscosity than the set limit would not circulate and cool effectively enough and the nameplate maximum output of the transformer could not be reached without overheating of the equipment. Such insulating oils are commercially available within a range of viscosities at 40° C. from about 7.4 to 12 mm$^2$/s, and are comprised of base oils (straight run, or mixtures of oils from different sources and processes) and various additives. There are also standards for natural ester oils (vegetable oils with additives), such as IEC 62770 and ASTM D6871 where much higher viscosities must be allowed due to the inherent properties of vegetable oils. To some extent, the physical and chemical properties of these oils compensate for the higher viscosity, but transformer manufacturers generally only allow (by warranty) the use of these oils in transformer units specially designed for the purpose. Although larger dimensions and higher material use is needed in such specially designed transformers, a higher over-load capacity, improved fire safety and the fact that the liquids are biodegradable, at times induces a transformer customer to choose such a unit. Although biodegradability of these liquids is an undeniable fact, they suffer from their very poor oxidation stability and hence high amounts of relatively toxic antioxidants need to be added to the formulated product. It should be mentioned that other synthetic insulating liquids are used in special applications, such as silicone oil and synthetic esters and that there are also industrial standards for these liquids.

EP2770512 describes an electrically insulating fluid comprising isoparaffins derived from renewable carbon source and having exceptionally high flash point of at least 210° C. The fluid has a high biodegradability and is more environmentally friendly than petroleum based fluids.

CN101230304 describes another environmental friendly oil derived from vegetable oil (i.e. from triglyceride) comprising an antioxidant and a pour point depressant.

None of the above-mentioned patent applications describe insulating oils which fulfil the strict requirements of either the standard IEC 60296 or ASTM D3487.

SUMMARY

Techniques and embodiments with the object to provide an electrical insulating oil having properties that address the above-mentioned problems and needs are disclosed herein. One object is to provide an electrical insulating oil having a low viscosity. Another object is to provide an electrical insulating oil, which shows a high oxidation stability. Still another object is to provide an electrical insulating oil which is environmental friendly. Still another object is to provide an electrical insulating oil which complies with standards allowing the usage of named insulating oil in cooling of electric transformers, electronics and alike.

In order to provide an electrical insulating oil having the properties described above, a method of producing such an insulating oil has been developed, the method comprising:
  providing a primary mixture of non-petroleum origin, comprising isomerized straight chain hydrocarbons;
  performing a distillation and/or stripping of the primary mixture;
  collecting a paraffinic base oil as a product of the distillation and/or stripping, comprising a mixture of isoalkanes and alkanes; and
  mixing the paraffinic base oil with an antioxidant additive.

Further, the method comprises the steps of repeatedly taking a sample of the product of the distillation and/or stripping, and controlling the collection of the paraffinic base oil in such a way that
  the collection of the product of distillation and/or stripping is started when the flash point of the sample is larger than 135° C. and lower than or equal to 160° C. (closed cup, Pensky-Marten), and the collection of the product of distillation and/or stripping is ended when the kinematic viscosity of the sample at 40° C. falls within the range of 3.4 to 4.5 mm²/s.

The objectives of the disclosure are also reached through the following method:
provising a primary mixture of non-petroleum origin, comprising isomerized straight chain hydrocarbons;
performing a distillation of the primary mixture;
collecting a paraffinic base oil as a product of the distillation, comprising a mixture of isoalkanes and alkanes; and
mixing the paraffinic base oil with an antioxidant additive.

During the distillation of the primary mixture, the collection of the paraffinic base oil is controlled in such a way that, the initial boiling point of the distillation cut is chosen so that the flash point is larger than 135° C. and lower than or equal to 160° C. (closed cup, Pensky-Marten), and the final boiling point of the distillation cut is chosen so that the kinematic viscosity of the paraffinic base oil at 40° C. falls within the range of 3.4 to 4.5 mm²/s.

By controlling both the flash point and the kinematic viscosity of the paraffinic base oil, the method allows the production of base oils having special properties that may fulfil the strict requirements of standards such as IEC 60296-2012 and/or ASTM D3487-2016 and may thereby be used as electrical insulating oils. As insulating oils complying with the above-mentioned standards, are almost invariably of fossil origin, it is of great ecological importance to produce new insulating oils of biogenic origin for the same applications.

In one embodiment, said kinematic viscosity at 40° C. falls in the range of 3.6 to 3.9 mm²/s, preferably about 3.8 mm²/s. The low viscosity will give possibilities to handle over-load, and/or to extend service life of the transformer because of improved cooling.

In another embodiment, the said flash point is larger than 135° C. and lower than or equal to 155° C., preferably lower than or equal to 150° C., more preferably lower than or equal to 145° C.

In another embodiment, the primary mixture comprises isomerized straight chain hydrocarbons in the range of $C_{10}$-$C_{20}$, preferably $C_{11}$-$C_{20}$, more preferably $C_{11}$-$C_{19}$, even more preferably $C_{12}$-$C_{19}$, most preferably $C_{12}$-$C_{18}$.

In still another embodiment, the paraffinic base oil comprises a mixture of isoalkanes and alkanes in the range of $C_{14}$-$C_{20}$, preferably $C_{15}$-$C_{19}$, more preferably $C_{16}$-$C_{18}$.

In another embodiment, the antioxidant additive is added in an amount of up to 0.4% by weight, preferably up to 0.3% by weight, more preferably up about to 0.24% by weight. Using antioxidant additives in low amount, generates an insulating oil of high purity and more environmental friendly. The antioxidant additive employed may preferably be BHT (butylated hydroxytoluene, also known as DBPC (dibutyl para-cresol)).

In still another embodiment, the insulating oil further comprises a gassing tendency lowering additive, such as tetralin, mono- or di-benzyltoluene or similar aromatic compounds. This is an advantage in cases where evolution of hydrogen gas under partial electrical discharge is a concern.

This type of insulating oil may preferably have properties in accordance with the insulating oil standard ASTM D3487-2016. Here too, there is a high ecological importance in developing insulating oils of biogenic origin.

In yet another embodiment, the paraffinic base oil is produced from a primary mixture comprising isomerised straight chain hydrocarbons of fatty acid origin, giving the oil a low pour point without the need to add pour point depressants and its renewable character.

In yet another embodiment, the insulating oil is used in an electric transformer, in electric shunt reactors, or in electric switch gear. Usage of an insulating oil in accordance with embodiments disclosed herein may also be applied in cooling of electronics, such as electronic circuits, processors, electronic components.

DETAILED DESCRIPTION

Embodiments described herein are to be regarded only as examples and are in no way to limit the scope of the protection provided by the patent claims.

The electrical insulating oil comprises a paraffinic base oil and preferably one or more additives. The base oil is prepared preferably from a non-petroleum, biogenic feedstock.

The isoalkanes of the feedstock may preferably originate from renewable fatty acids, or triglycerides processed by hydrodeoxygenation, i.e. the process for manufacturing of HVO, Hydrotreated Vegetable Oil, or from biogas (via the Fischer-Tropsch process followed by isomerization). Other potential original feedstocks are biooils from hydrothermal treatment of biomass, depolymerized lignin, or from biochemically available hydrocarbons such asfarnesene. In the latter cases, more elaborate hydrocarbon transformations are needed such as oligomerization, hydrotreatment, and hydrocracking.

The paraffinic base oil of the present disclosure when produced from animal or plant fats is a result of hydrotreatment, leading to breaking of all carbon-oxygen bonds and saturation of all carbon-carbon double bonds, followed by hydroisomerization. The efficiency of the isomerization must be high enough to satisfy the demands on pour point of the final product and can be performed by proprietary or open methods.

The base oil in the electrical insulating oil of the present disclosure was isolated by a process of, possibly fractional, distillation and/or by stripping of a feedstock as described above. During a distillation step, the collection of the paraffinic base oil (of the desired distillation cut) was controlled in such a way that the initial boiling point of the distillation cut was chosen so that the flash point requirement of the resulting oil fulfils the requirements of IEC 60296-2012 (>135° C. closed cup, Pensky-Marten) and/or ASTM D3487-2016 (145° C. Cleveland open cup). The final boiling point of the distillation cut was chosen so that the viscosity of the resulting oil fell within the range of 3.4 to 4.5 mm²/s at 40° C., or 1.3 to 1.6 cSt at 100° C.

Feedstock example: isomerized saturated hydrocarbon mixture ($C_{10}$-$C_{20}$), having a boiling point range within 180-310° C., a kinematic viscosity at 40° C. of about 2.5-3.2 cSt, a flash point in the range of 100-120° C. (closed cup), and a pour point in the range of −60 to −40° C.

The initial boiling point measured was in the range of 280-290° C., and the final boiling point in the range of 305-315° C. The possibly fractional distillation process is controlled by adjustment of the temperature and effective length of the distillation column by means of periodic measurement of the flash point and kinematic viscosity of the collected fraction. This gives a mixture comprising isoalkanes and alkanes in the range of $C_{14}$-$C_{20}$.

Similarly, a separation of the desired paraffinic base oil from the isomerized saturated hydrocarbons can be achieved by regular stripping, employing known stripping agents such as inert gas, air, hydrocarbon gas, or steam. The regular control of the flash point and of the kinematic viscosity allow even in such case the controlled collection of desired product.

Preferably, the collection of the product of distillation or stripping is started when the flash point of the sample is at a predetermined temperature which is larger than 135° C. and lower than or equal to 160° C. In some embodiments, the collection of the product of distillation or stripping is started when the flash point of the sample is just above 135° C. In other embodiments, the collection of the product of distillation or stripping is started when the flash point of the sample is 160° C.

The electrical insulating oil of the present disclosure comprises the paraffinic base oil isolated as above, preferably also comprising an antioxidant additive. A surprisingly high responsiveness to the antioxidant BHT was observed, enabling the use of low quantities of additive while reaching excellent oxidation stability of the final product. Whereas the standards IEC 60296 and ASTM D3487 allow for 0.4 and 0.3% by weight of antioxidant respectively, the insulating oil of the present disclosure shows excellent oxidation stability with as little as 0.24% by weight of BHT. The physical properties of such an electrical insulating oil are listed in Table 2 below.

The electrical insulating oil of the present disclosure shows a content of isoalkanes higher than 70% by mass, and a biogenic carbon content of more than 99.60% as measured by ASTM D6866.

The electrical insulating oil of the present disclosure may optionally comprise even a gassing tendency lowering additive, giving limited gassing tendency or gas absorption properties. This can be an advantage is cases where evolution of hydrogen gas under partial electrical discharge is a concern.

The electrical insulating oil of the present disclosure shows a surprisingly low viscosity. In fact, it has a much lower viscosity than previously commercially available insulating oils fulfilling either IEC 60296-2012 or ASTM D3487-2016. This means that any transformer designed for use of an oil fulfilling any of the two standards will function as per manufacturer's nameplate under normal circumstances when filled with oil in accordance with embodiments of the present disclosure. In addition, the low viscosity will give possibilities to handle over-load, and/or give the possibility to extend service life of the transformer because of improved cooling. The oil in accordance with the present disclosure gives the possibility to design a transformer in such a way that turbulent flow, which is more efficient for heat transfer than laminar flow, occurs both through the winding and through the cooling system. The former in not usually possible in the winding part because the overall flow speed cannot exceed a certain value, for example commonly 0.5 m/s, to avoid static electrification phenomena. This is the case for both natural convection (Oil Natural, ON) and when an external pump is used to force the oil flow through the system (Oil Forced, OF). In the latter case the lower viscosity of embodiments of the oil will give a decreased power consumption of the pump, or allow for a smaller, more energy efficient pump in the design. Another transformer design possibility is overall dimensional shrinkage, or the possibility to build a unit capable of higher output for the same ground footprint. The latter is of importance as transportation of transformer units from the site of production to the final point of use is a formidable hurdle because of the size of large power transformers. Additionally, the electrical insulating oil in accordance with embodiments herein will impregnate the solid insulation of a transformer faster in the production of the transformer.

The term 'isomerized saturated hydrocarbon mixture" refers herein to a mixture of oils containing a substantial amount of isoparaffinic compounds prepared by hydrotreating and isomerizing an oil derived from renewable or recycled raw materials.

The renewable or recycled raw materials can be originated from plants or animals, such as vegetable oils, animal fats, fish oils and mixtures thereof. Examples of suitable renewable and recycled raw materials include, but are not limited to, rapeseed oil, canola oil, colza oil, tall oil, sunflower oil, soybean oil, hemp oil, olive oil, linseed oil, mustard oil, palm oil, arachis oil, castor oil, coconut oil, animal fats, such as suet, tallow, blubber. The renewable or recycled raw materials can also be produced by microbes such as algae and bacteria. Further, the renewable or recycled raw materials encompass condensation products, such as esters, and other derivates of the renewable or recycled raw materials.

As renewable raw material we refer to any renewable raw material. For example, the renewable raw material may be a wax, a fat or an oil and may also be free fatty acid(s) (including salts thereof) or fatty acid ester(s).

The renewable raw material is preferably a fat or an oil, more preferably a fat or an oil of plant origin (including algae and fungi), of animal origin (including fish) or of microbial origin, and in particular vegetable oil/fat, animal oil/fat, waste oil/fat from the food industry, algae oil/fat and/or microbial oil, such as palm oil, rapeseed oil, algae oil, jatropha oil, soybean oil, cooking oil, vegetable oil, animal fat and/or fish fat. The renewable raw material may be a mixture of compounds which is derived from a renewable source.

Usually, the renewable raw material comprises heteroatoms (in addition to carbon atoms and hydrogen atoms), the renewable raw material may in particular comprise oxygen atoms. If the renewable raw material comprises heteroatoms, it is preferable that the hydrotreatment is carried out to remove the heteroatoms and to produce a hydrocarbon material, preferably n-paraffins or a mixture of n-paraffins and iso-paraffins. The hydrotreatment may also be carried out such that isomerisation is promoted so as to predominantly (more than 50 wt.-% of the hydrocarbon products) produce iso-paraffins.

It is obvious to the person skilled in the art that isomerisation (a step of isomerising) can refer to any method which increases the degree of isomerisation, i.e. which increases the content of carbon chains having a high degree of branching relative to the content of carbon chains having a lower degree of branching. For example, isomerisation may include catalytic isomerisation in the presence of a catalyst and in the presence or absence of hydrogen and may also include cracking.

Experimental Data

1. General Method:

A feedstock example is an isomerized saturated hydrocarbon mixture (C10-C20), having a boiling point range within 180-310° C., a kinematic viscosity at 40° C. of about 2.5-3.2 cSt, a flash point in the range of 100-120° C. (closed cup), and a pour point in the range of −60 to −40° C.

The initial boiling point measured was in the range of 280-290° C., and the final boiling point in the range of 305-315° C. The possibly fractional distillation process is controlled by adjustment of the temperature and effective length of the distillation column by means of periodic measurement of the flash point and kinematic viscosity of the collected fraction. This gives a mixture comprising isoalkanes and alkanes in the range of $C_{14}$-$C_{20}$.

2. Description of the Chemical Structure of the Preferred Biogenic Base Oil Composition.

In one example, the carbon chain distribution of a base oil obtained by distillation contained $C_{14}$-$C_{18}$ carbon chain lengths, FP 151° C. (ENISO2719), and showed a viscosity of 3.8 mm²/s (EN ISO 3104) (see iTable 1, below). The distribution of n-paraffinic and iso-paraffinic component was identified by gas chromatography using FID detector. The utilized method was developed for carbon chain lengths of <$C_{36}$. Area-% of hydrocarbons in the FID-chromatogram is equal to wt-% of the component. The components were identified based on model compound (normal-paraffins) chromatograms. The limit of quantitation for individual components is 0.01 wt-%.

TABLE 1

Carbon chain distribution of the base oil (GC method).

| Carbon chain length | iso-paraffins, wt % | normal-paraffins, wt-% | Sum, wt-% |
|---|---|---|---|
| 2 | 0.0 | 0.0 | 0.0 |
| 3 | 0.0 | 0.0 | 0.0 |
| 4 | 0.0 | 0.0 | 0.0 |
| 5 | 0.0 | 0.0 | 0.0 |
| 6 | 0.0 | 0.0 | 0.0 |
| 7 | 0.0 | 0.0 | 0.0 |
| 8 | 0.0 | 0.0 | 0.0 |
| 9 | 0.0 | 0.0 | 0.0 |
| 10 | 0.0 | 0.0 | 0.0 |
| 11 | 0.0 | 0.0 | 0.0 |
| 12 | 0.0 | 0.0 | 0.0 |
| 13 | 0.0 | 0.0 | 0.0 |
| 14 | 0.0 | 0.0 | 0.0 |
| 15 | 0.1 | 0.0 | 0.1 |
| 16 | 1.8 | 0.3 | 2.0 |
| 17 | 7.3 | 5.2 | 12.4 |
| 18 | 79.3 | 2.6 | 81.9 |
| 19 | 1.3 | 0.0 | 1.3 |
| 20 | 1.1 | 0.0 | 1.1 |
| 21 | 0.2 | 0.0 | 0.2 |
| 22 | 0.2 | 0.0 | 0.2 |
| 23 | 0.2 | 0.0 | 0.2 |
| 24 | 0.2 | 0.0 | 0.2 |
| 25 | 0.0 | 0.0 | 0.0 |
| >C36 | 0.0 | 0.0 | 0.0 |
| C25-C29 | 0.2 | 0.0 | 0.2 |
| C30-C36 | 0.0 | 0.0 | 0.0 |
| Sum | 91.8 | 8.2 | 100.0 |

The content of iso-paraffins is 91 wt-% of which 57 wt % are di or poly methylated.

3. Another Example of the Detection of the Biogenic Content.

Biogenic hydrocarbon content was detected by DIN51637. The 14C isotope content denotes to the biogenic content of the sample. Radioactive carbon isotope 14C beta decay can be detected by liquid scintillation counting. In fossil materials 14C is fully decayed whereas in biobased materials the 14C isotope is present in amount relative to the amount produced in the atmosphere.

INDUSTRIAL APPLICABILITY

As illustrated in the examples above, but not restricted to solely these applications, the electrical insulating oil of the present disclosure is suitable for a wide variety of industrial applications.

TABLE 2

Examples of properties of the electrical insulating oil of the present disclosure

| Property | Method | Typical | Limit IEC 60296-2012 | Unit |
|---|---|---|---|---|
| Viscosity 40° C. | ISO 3104 | 3.8 | <12 | mm²/s |
| Viscosity −30° C. | ISO 3104 | 50 | <1800 | mm²/s |
| Pour point | ISO 3016 | −42 | <−40 | ° C. |
| Water content | IEC 60814 | 25 | <30 (bulk), <40 (drums/LBC) | mg/kg |
| Breakdown voltage | IEC 60156 | 80 | >30 | kV |
| Density 20° C. | ISO 3175 | 0.786 | <0.895 | g/ml |
| DDF 90° C. | IEC 60247 | 0.001 | <0.005 | |
| Appearance | | Clear/bright | Clear/bright | |
| Acidity | IEC 62021 | <0.01 | <0.01 | mg KOH/g |
| Total sulphur | ISO 14596 | <1 | <500 | mg/kg |
| Corrosive Sulphur (Ag) | DIN 51353 | Not corrosive | Not corrosive | |
| Potentially corrosive sulphur (Cu) | IEC 62535 | Not corrosive | Not corrosive | |
| DBDS | IEC 62697-1 | Not detectable | Not detectable | |
| Inhibitor (BHT) | IEC 60666 | 0.24 | 0.4 | % |
| Metal passivators | IEC 60666 | Not detectable | Not detectable | |
| Furfural | IEC 61198 | Not detectable | Not detectable | |
| Oxidation stability 500 h | IEC 61125C | TA 0.1 Sludge 0.02 DDF 0.01 | <0.3 <0.05 <0.05 | mg KOH/g % |
| Flash point | ISO 2719 | 145 | >135 | ° C. |
| PCA | IP 346 | 0 | <3 | % |
| PCB | IEC 61619 | Not detectable | Not detectable | |

The invention claimed is:

1. A method of producing a non-petroleum based electrical insulating oil, the method comprising:
    providing a primary mixture of non-petroleum origin, containing isomerized straight chain hydrocarbons in a range of $C_{10}$-$C_{20}$;
    performing a distillation and/or stripping of the primary mixture;
    collecting a paraffinic base oil as a product of the distillation and/or stripping, containing a mixture of isoalkanes and alkanes in a range of $C_{14}$-$C_{20}$;
    mixing the paraffinic base oil with an antioxidant additive;
    repeatedly taking a sample of a product of the distillation and/or stripping; and
    controlling collection of the paraffinic base oil in such a way that:
        collection of the product of distillation or stripping is started when a flash point of the sample is larger than 135° C. and lower than or equal to 160° C. measured by closed cup, Pensky-Marten; and
        the collection of the product of distillation or stripping is ended when a kinematic viscosity of the sample at 40° C. falls within a range of 3.4 to 4.5 mm$^2$/s.

2. The method according to claim 1, wherein the said kinematic viscosity at 40° C. is selected to fall within a range of 3.6 to 3.9 mm$^2$/s, or to be about 3.8 mm$^2$/s.

3. The method according to claim 1, wherein the flash point is selected to be larger than 135° C. and lower than or equal to 155° C., or lower than or equal to 150° C., or lower than or equal to 145° C.

4. The method according to claim 1, wherein the primary mixture comprises:
    isomerized straight chain hydrocarbons selected to be in a range of at least one of $C_{11}$-$C_{20}$, $C_{11}$-$C_{19}$, $C_{12}$-$C_{19}$, or $C_{12}$-$C_{18}$.

5. The method according to claim 1, wherein the paraffinic base oil comprises:
    a mixture of isoalkanes and alkanes selected to be in a range of $C_{15}$-$C_{19}$ or $C_{16}$-$C_{18}$.

6. The method according to claim 1, wherein the antioxidant additive is selected to be in an amount of up to 0.4% by weight, up to 0.3% by weight, or up about to 0.24% by weight.

7. The method according to claim 1, wherein the antioxidant additive is butylated hydroxytoluene (BHT).

8. The method according to claim 1, comprising:
    mixing the paraffinic base oil with a gassing tendency lowering additive.

9. The method according to claim 1, wherein the primary mixture comprises:
    isomerised straight chain hydrocarbons of fatty acid origin.

10. A non-petroleum based electrical insulating oil manufactured according to the method according to claim 1.

11. The method according to claim 1, comprising:
    applying the a non-petroleum based electrical insulating oil for cooling of at least one electronic circuit, processor, electronic component, electric transformer, electric shunt reactor, or electric switch gear.

12. A method of producing a non-petroleum based electrical insulating oil, the method comprising:
    providing a primary mixture of non-petroleum origin, containing isomerized straight chain hydrocarbons in a range of $C_{10}$-$C_{20}$;
    performing a distillation of the primary mixture;
    collecting a paraffinic base oil as a product of the distillation, containing a mixture of isoalkanes and alkanes in a range of $C_{14}$-$C_{20}$;
    mixing the paraffinic base oil with an antioxidant additive;
    controlling collection of the paraffinic base oil in such a way that:
        an initial boiling point of a distillation cut is chosen so that a flash point is larger than 135° C. and lower than or equal to 160° C. measured by closed cup, Pensky-Marten; and
        a final boiling point of the distillation cut is chosen so that a kinematic viscosity of the paraffinic base oil at 40° C. falls within a range of 3.4 to 4.5 mm$^2$/s.

13. The method according to claim 12, wherein the said kinematic viscosity at 40° C. is selected to fall within a range of 3.6 to 3.9 mm$^2$/s, or to be about 3.8 mm$^2$/s.

14. The method according to claim 12, wherein the flash point is selected to be larger than 135° C. and lower than or equal to 155° C., or lower than or equal to 150° C., or lower than or equal to 145° C.

15. The method according to claim 12, wherein the primary mixture comprises:
    isomerized straight chain hydrocarbons selected to be in a range of at least one of $C_{11}$-$C_{20}$, $C_{11}$-$C_{19}$, $C_{12}$-$C_{19}$, or $C_{12}$-$C_{18}$.

16. The method according to claim 12, wherein the paraffinic base oil comprises:
    a mixture of isoalkanes and alkanes selected to be in a range of $C_{15}$-$C_{19}$ or $C_{16}$-$C_{18}$.

17. The method according to claim 12, wherein the antioxidant additive is selected to be in an amount of up to 0.4% by weight, up to 0.3% by weight, or up about to 0.24% by weight.

18. The method according to claim 12, wherein the antioxidant additive is butylated hydroxytoluene (BHT).

19. The method according to claim 12, comprising:
    mixing the paraffinic base oil with a gassing tendency lowering additive.

20. The method according to claim 12, wherein the primary mixture comprises:
    isomerised straight chain hydrocarbons of fatty acid origin.

* * * * *